(No Model.)
J. P. ANDERSON.
COCOA NUT SHELLER.
No. 286,368. Patented Oct. 9, 1883.
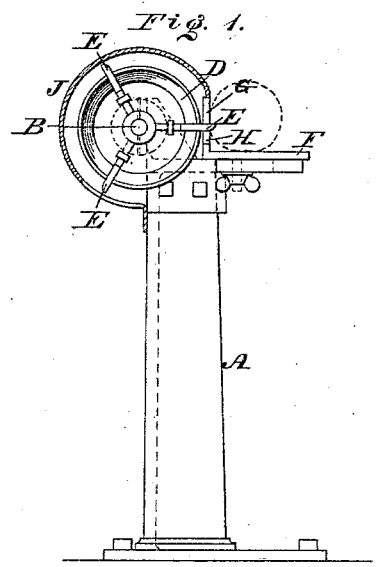
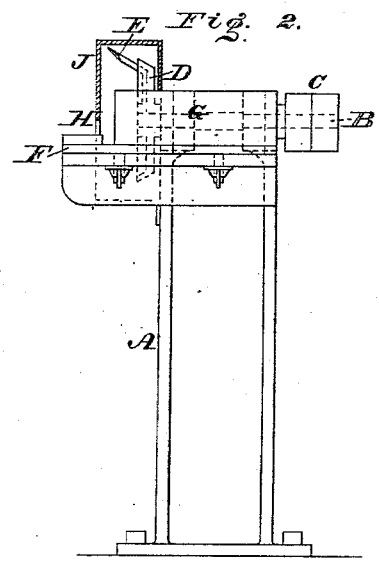
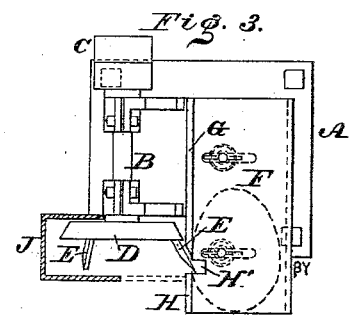
WITNESSES:
L. Douville
W. F. Kircher
INVENTOR:
John P. Anderson
John A. Wiedersheim
ATTORNEY.

UNITED STATES PATENT OFFICE.

JOHN P. ANDERSON, OF PHILADELPHIA, PENNSYLVANIA.

COCOANUT-SHELLER.

SPECIFICATION forming part of Letters Patent No. 286,368, dated October 9, 1883.

Application filed December 22, 1882. (No model.)

*To all whom it may concern:*

Be it known that I, JOHN P. ANDERSON, a citizen of the United States, residing in the city and county of Philadelphia, State of Pennsylvania, have invented a new and useful Improvement in Cocoanut-Shellers, which improvement is fully set forth in the following specification and accompanying drawings, in which—

Figure 1 is a front view of the cocoanut-sheller embodying my invention. Fig. 2 is a side view thereof, partly in vertical section. Fig. 3 is a top or plan view partly in horizontal section.

Similar letters of reference indicate corresponding in the several figures.

My invention consists of means for easily, rapidly, and effectively shelling cocoanuts and leaving the body of flesh intact, as will be hereinafter fully set forth and pointed out in the claim.

Referring to the drawings, A represents a stand or frame, and B represents a rotating shaft, which is mounted on the upper end of said stand, and has keyed or otherwise secured to it at opposite ends a pulley, C, and head D. To the head is secured a series of radial cutters or shelling-blades, E, which project outwardly and obliquely, and may be adjusted nearer to or farther from the periphery of the head relatively to the size of cocoanuts to be shelled.

F represents a table, which is mounted on the upper part of the stand A, and extends parallel with the shaft B, and may be moved toward or from the head D, so as to be adjusted relatively to the cutters or blades E, for purposes of shelling cocoanuts of different sizes.

Secured to or formed with the inner side of the table F is a vertical abutment or support, G, the front end of which is cut away, as at H, to permit the ends of the blades E to pass said abutment, and the inner side of the table is also cut away, as at H', at a place coinciding with the cut-away portion H of the abutment G, to permit the ends of the blades to pass through the table, it being noticed that the blades, being set obliquely, as has been stated, have the path of rotation of their ends within the portion of the space of the table adjacent to the head D, so as to reach the shell of the nut resting on said table, the abutment G and table F, owing to the cut-away parts H H', thus presenting no obstruction to the rotation of the blades.

Power is applied to the shaft B either by means of a belt on the pulley C or a crank attached to said shaft. The cocoanut is placed on the table F and rested against the abutment G. The cutters or blades E then strike the shell of the nut tangentially, (see Fig. 3,) the effect of which is to cut or break and remove a piece or pieces of the shell, and as the nut is shifted and its other end presented to the blades, the entire shell will be cut or broken and removed without injury to the body of flesh of the nut, the operation being accomplished in a convenient, rapid, and expeditious manner. The blades are inclosed by a guard, J, for protecting the hands of the operator and preventing flying of pieces of the cocoanut-shell.

Having thus described my invention, what I claim as new, and desire to secure by Letters Patent, is—

In a cocoanut-sheller, a blade or blades connected with a rotating head and a table formed with a vertical abutment, no obstruction being left in the path of rotation of said blade or blades, substantially as and for the purpose set forth.

J. P. ANDERSON.

Witnesses:
JOHN A. WIEDERSHEIM,
A. P. GRANT.